(12) United States Patent
Moataghed

(10) Patent No.: US 7,742,491 B2
(45) Date of Patent: *Jun. 22, 2010

(54) DSP VOICE BUFFERSIZE NEGOTIATION BETWEEN DSPS FOR VOICE PACKET END DEVICES

(75) Inventor: Keyvan Moataghed, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1727 days.

This patent is subject to a terminal disclaimer.

(21) Appl. No.: 10/902,190

(22) Filed: Jul. 28, 2004

(65) Prior Publication Data

US 2005/0002411 A1 Jan. 6, 2005

Related U.S. Application Data

(63) Continuation of application No. 09/160,470, filed on Sep. 24, 1998, now Pat. No. 6,778,545.

(51) Int. Cl.
*H04L 12/56* (2006.01)

(52) U.S. Cl. .................. 370/413; 370/252; 370/254; 370/352; 370/356; 370/410; 370/419; 370/467; 370/468; 710/305

(58) Field of Classification Search ............ 370/252, 370/254, 352, 356, 465–468, 413, 419; 340/825.07; 710/305

See application file for complete search history.

(56) References Cited

U.S. PATENT DOCUMENTS

| | | | | |
|---|---|---|---|---|
| 5,235,595 A | * | 8/1993 | O'Dowd | 370/392 |
| 5,291,481 A | * | 3/1994 | Doshi et al. | 370/230 |
| 5,459,455 A | * | 10/1995 | Sato | 370/410 |
| 5,463,616 A | * | 10/1995 | Kruse et al. | 370/276 |
| 5,546,549 A | * | 8/1996 | Barrett et al. | 710/305 |
| 5,838,915 A | | 11/1998 | Klausmeier et al. | |
| 5,838,994 A | | 11/1998 | Valizadeh | |
| 5,940,479 A | * | 8/1999 | Guy et al. | 379/93.01 |
| 6,038,294 A | * | 3/2000 | Tran et al. | 379/93.07 |
| 6,298,057 B1 | * | 10/2001 | Guy et al. | 370/389 |

* cited by examiner

*Primary Examiner*—William Trost, IV
*Assistant Examiner*—Toan D Nguyen
(74) *Attorney, Agent, or Firm*—Marger Johnson & McCollom, P.C.

(57) ABSTRACT

A packet switching network system for use in transferring information that is in the form of packets and including an originating device and a destination device for communicating therebetween through a packet switching network, the originating device including a sending device having a first buffer with a predetermined first buffer size, the first buffer being used to store information that is to be sent to the destination unit, the sending device for sending a request packet including the first buffer size, through the packet switching network, to the destination device, the destination device including a receiving device having a second buffer with a predetermined second buffer size, the second buffer size being used for storing information that is received from the originating device, the receiving device for receiving a request packet including the first buffer size from the originating device, determining whether or not the received first buffer size is supported by the destination device, and accordingly sending back a response, through the packet switching network, to the originating device, wherein, during initialization, the originating device and the destination device enter into negotiations as to a mutually-acceptable buffer size that is to be used for information transfer by the packet switching network system.

12 Claims, 8 Drawing Sheets

DSP VOICE BUFFERSIZE NEGOTIATION BETWEEN DSPS FOR VOICE PACKET END DEVICES

CROSS-REFERENCE TO RELATED APPLICATION(S)

This application is a continuation application of my earlier-filed U.S. patent application Ser. No. 09/160,470, filed on Sep. 24, 1998 now U.S. Pat. No. 6,778,545, by Keyvan Moataghed.

BACKGROUND OF THE INVENTION

1. Field of the Invention

The present invention related generally to the field of computer networks and in particular, to transferring of voice information over frame relay in packet switching network environments.

2. Description of the Prior Art

In a networking environment where information, such as data, voice, video, audio and like information, is destined to travel from one remotely situated device to another device, two types of such networking environments may be employed: circuit switching network and packet switching network.

FIG. 1 shows conceptual views of both of these types of networking environments. A circuit switching network 10 is shown to include a first telecommunication device 12, which may be a telephone, coupled through a path 14 to a second telecommunication device 16, which may also be telephone. The coupling between the two devices 12 and 16, through the path 14, includes various equipment, 18 and 20, which effect transfer of the information being communicated through the path 14. The circuit switching network 10 is shown in FIG. 1 to demonstrate that when information is being transferred from a given source to a particular destination, such as from device 12 to device 16, the information will always take the same path, i.e. through the equipment 18 and 20.

In contrast thereto, a packet switching network 22 is shown in FIG. 1 to demonstrate that the information being transferred does not necessarily take the same path when it is transferred from one device to another. In FIG. 1, the packet switching network 22 is shown to include a first telecommunication device 24, coupled through a packet switching network structure 26, to a second telecommunication device 28.

The packet switching network structure 26 includes a plurality of network equipment, such as routers 30, 32 and 34. Information that is being, for example, transferred from the first device 24 to the second device 28, does not necessarily take the same path every time. At one time, such an information may take a path 36, which goes through the equipment 30 and 32 and when sent again another time, the same information may go through a different path 38, which includes the equipment 34. In fact, in packet switching networks, there is much equipment through which information may travel to get from one device to another. The path that information takes is in part a function of the intensity of traffic through the network. For example, if the devices 24 and 28 were telephone devices and there were calls being made during a time when many callers were initiating phone calls, the path that the voice information would take is likely to be entirely different than when the devices 24 and 28 transfer voice information during a time when there are not many callers accessing the system. An example of what the packet switching network structure 26 may be is the Internet, in which case, voice may travel therethrough to get from the device 24. In this case, examples of what the devices 24 and 28 may be are personal computers (PCs).

Thus, in circuit switching networks, the same path is used to transfer information and that path is apriori known, whereas, in the case of packet switching networks, the path that information takes is firstly based upon the availability of the equipment and circuits and secondly not a dedicated path or apriori known. Accordingly, transfer of voice information through the Internet is less costly than the transfer of the same kind of information through a circuit switching network. That is, in a circuit switching network, such as used by traditional telephone companies, each user is assigned a dedicated path whereas in an Internet environment, multiple users share the same path.

In a packet switching environment such as the Internet, since different paths may be taken for transfer of information, different amounts of time delay are associated with the transfer of data. For example, in FIG. 1, in the packet switching network 22, if the information being transferred between devices 24 and 28 takes the path 36, this may result in less delay than if the same information transfer were to take the path 38 since the latter is going through an additional router. As the path that information will take in a packet switching network environment is unknown, so is the delay associated with that path. Accordingly, information being transferred is first buffered (or temporarily stored) to account for the delay associated with the transfer of information.

When information is sent through a packet switching network environment, it is broken up into various packets and each packet is sent in a frame over the network. When all of the packets of the same information arrive at their destination, they are placed back together for use by the user. Data being sent in this respect is not much affected by the delay that each packet may experience because even if this delay accumulates to minutes, a user is not particularly disturbed to wait that long before receiving data. However, when this information is in the form of voice, i.e. voice sent over the Internet, the accumulative amount of delay experienced by the separate packets that are sent through the Internet is often times annoying to the users. For example, if one were to speak through a telephone that was coupled to transfer information through the network and would have to wait 10 seconds to receive a voice back from another user at the destination site, there would be much disturbance to the listener.

To account for this delay, prior art methods and apparatus have employed buffering techniques to store the information that is to be transferred in a temporary location while previous information is being sent through the network. On the receiving side, the information that is received is buffered while the user is listening to the information previously received. However, due to the buffer size differences between the sending side and the receiving side of the network, there, nevertheless, remains a significant problem with the delay associated with transferring voice information through a packet switching networking environment, such as the Internet, that has proven to be disturbing to users of this type of system.

There is therefore a need to maximize the performance of a system for transfer of voice information from one device to another through a packet switching network such as to avoid unnecessary delay experienced by users of the system.

SUMMARY OF THE INVENTION

Briefly, a packet switching network system for use in transferring information that is in the form of packets includes an originating device and a destination device for communicating therebetween through a packet switching network. The originating device includes a sending device having a first buffer with a predetermined first buffer size, the first buffer being used to store information that is to be sent to the destination unit. The sending device sends a request packet including the first buffer size, through the packet switching network, to the destination device, the latter including a receiving device having a second buffer with a predetermined second buffer size, the second buffer being used for storing information that is received from the originating device. The receiving device receives a request packet including the first buffer size from the originating device, determines whether or not the received first buffer size is supported by the destination device, and accordingly sends back a response, through the packet switching network, to the originating device, wherein the originating device and the destination device enter into negotiations as to a mutually-acceptable buffer size that is to be used for information transfer by the packet switching network system.

The foregoing and other features of the invention will no doubt become apparent after reading the following detailed description of the preferred embodiments, which is illustrated in the several figures of the drawing.

IN THE DRAWINGS

DETAILED DESCRIPTION OF THE PREFERRED EMBODIMENTS

Figure 1:
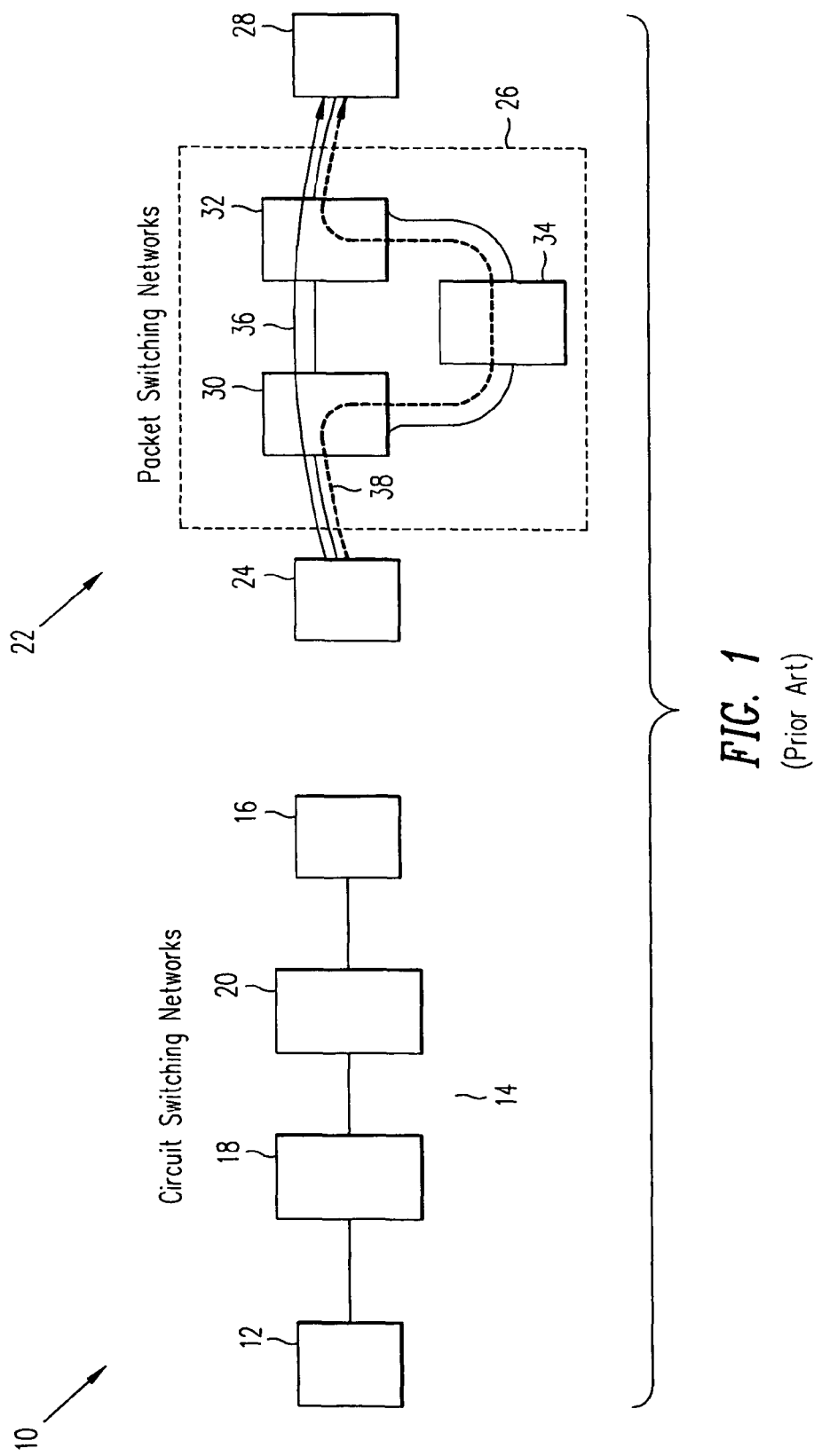
FIG. 1 shows a conceptual view of two types of networking environments: circuit switching network and packet switching network.
Figure 2:
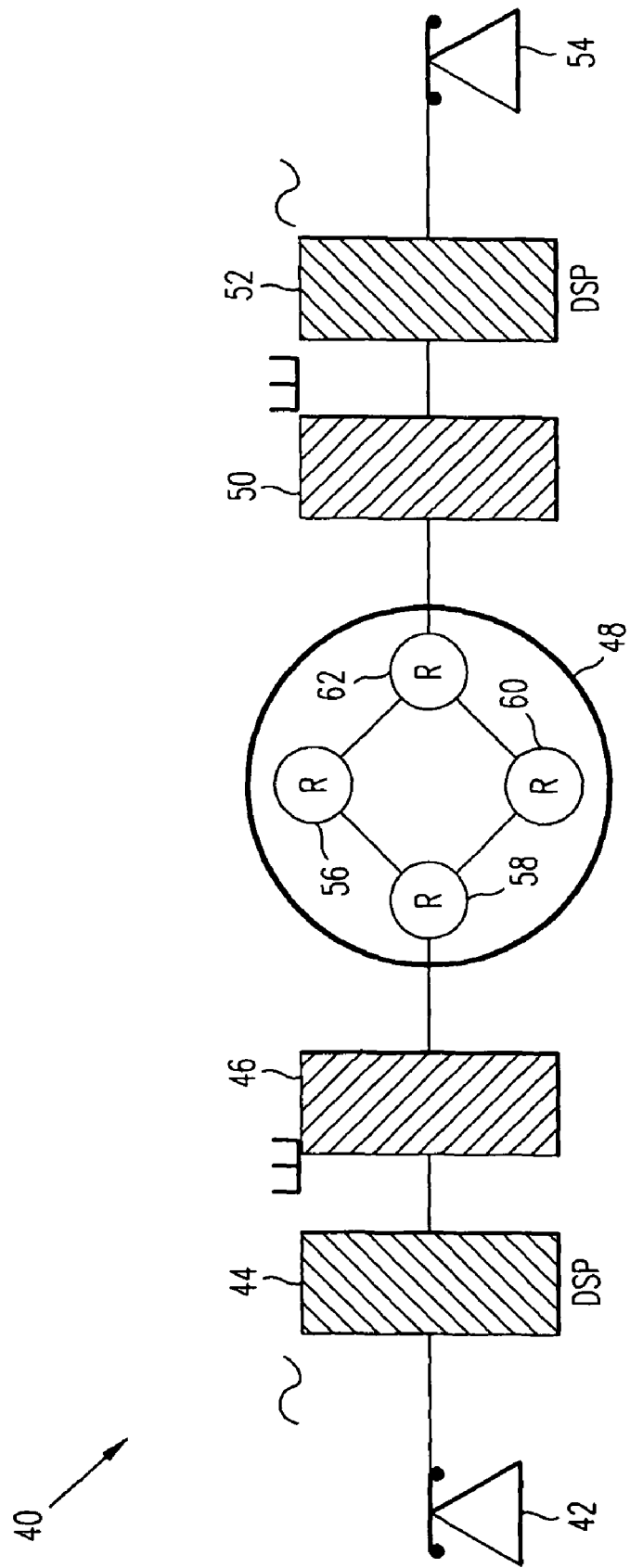
FIG. 2 illustrates a packet switching networking structure including the method and apparatus of a preferred embodiment of the present invention.

Referring now to FIG. 2., a packet switching networking structure 40 is shown to include a first telecommunications device 42, which may be a telephone device, coupled to a sending digital signal processing (DSP) device 44, which is in turn coupled to a sending interface device 46 for coupling the information from the device 42 through a packet switching network 48 to a second interface device 50 (devices 42, 44 and 46 may be collectively referred to as a sending device). The second interface device 50 is coupled to a second DSP device 52, which is in turn coupled to a second telecommunication device 54 (devices 50, 52 and 54 may be collectively referred to as a receiving device).

The devices 42 and 54 may be telephone devices that operate through the Internet, or the packet switching network 48. An example of the packet switching network 48 is the Internet. The DSP devices 44 and 52 process the information being sent and received by the devices 42 and 54. For example, if information was to be sent by the device 42, it would first be converted from analog format to digital format by the DSP device 44 and then sent, through the interface 46 and the network 48, to the interface device 50. Subsequently, the interface device 50 would transfer the information that was sent by the device 42 to the DSP device 52 where it would be converted from digital form to analog format prior to being provided to the user at the device 54.

As shown in FIG. 2, the network 48 generally comprises a plurality of router equipment, 56, 58, 60 and 62, for transferring information in packet form between the devices 42 and 54. As previously noted, information may take different paths through the routers each time it is sent. A router is a device that can select a path that information should take thereby requiring the router to have an understanding of the network and how to determine the best route for the path.

The interface devices 46 and 50 place the information in a predetermined format. For example, if voice is being sent from the device 42 to the device 54, the interface device 46 places the voice information in a format specifying the origination address (or where the voice is being sent from,) followed by some header information and the contents of the voice information. The voice information may be further followed by additional protocol information. On the receiving end, the interface device 50 would similarly parse the pre-formatted information in order to extract voice contents for use by the device 54.

Each of the DSP devices 44 and 52 have associated therewith, a buffer with a predetermined buffer size. An example of a DSP device includes a DSP chip (or semiconductor device) manufactured by Texas Instrument, Inc., such as the TMS320LC542. Such a device may use an internal buffer that is 20, 22, 30 or 32 bytes in size depending on how the chip was being configured. Similarly, other DSP devices, made available by other manufacturers for commercial use, may have different buffer sizes associated therewith. Accordingly, the buffer size associated with the DSP device 44 may be and is likely to be different than the buffer size associated with the DSP device 52. This problem is perhaps better appreciate given an example.

If, for instance, the buffer size of the DSP device 44, in FIG. 2, is 32 bytes and the buffer size of the DSP device 52 is 20 bytes, there is a delay associated with the processing of voice information that is obvious to users of the system and that increases substantially as more users access the system. That is, the DSP device 44 and the interface device 46 will send the 32 bytes of information through the network 48. On the receive side, since the DSP buffer is only 20 bytes in size, the interface device 50 passes the first 20 bytes of the 32-byte wide information to the DSP device 52 for processing and stores the remainder of the 32 bytes, i.e. 12 bytes, in a temporary buffer location for later processing. This results in wasting of buffer storage space since the 12 remaining bytes will be saved in a 20-byte buffer space leaving eight bytes of that buffer space unused. Furthermore, there is a delay associated with first processing of the first 20 bytes and later processing of the remaining 12 bytes, which leads to potential disturbance to users of the system. This delay is even more severely noticed when there are multiple users of the system. For example, while not shown in FIG. 2, there may be many more devices such as device 54, where multiple users are receiving calls through the network 48. In this case, while there is one interface device 50, there are as many DSP devices (similar to the DSP device 52) as there are users and each of these DSP devices will experience a delay in processing thereby leading to a substantially noticeable delay to the multiple users of the system.

In a preferred embodiment of the present invention, this problem is resolved by negotiating the sizes of the send and receive DSP buffers prior to transferring voice information over the network. That is, in operation, after the user at the device 42 initiates a telephone call (or dials the numbers), the DSP device 44, through the interface device 46 and the network 48, transmits the size of its buffer in the form of a packet to the DSP device 52. In the example provided above, the buffer size is 32 bytes. Then, a response is awaited as to whether such a buffer size can be supported by the receive side. If the DSP device 52, on the receive side, similarly supports a 32-byte buffer size, a reply is sent accordingly back through the interface device 50, the network 48 and the interface device 46 to so indicate and communication begins.

If on the other hand, this buffer size can not be supported by the DSP device 52, such as in the example provided above where a 20-byte buffer size was employed in the receive side, a reply is similarly sent back from the DSP device 52 to the DSP device 44. In this case, a 20-byte size buffer is employed when communication begins. While this may appear at first to be an ineffective use of the 32-byte buffer size, employing a smaller buffer size that can be supported by the send as well as the receive apparatus effectively increases system performance over the use of a single higher buffer size because a significant delay would be experienced by temporary storage of information while processing previous information on the side having the smaller buffer size, as explained above.

This negotiation of buffer sizes is to become even more important with the advent of different send and receive apparatus that are not necessarily compatible with one another due to having been manufactured by various companies. For example, today, dedicated structures (using the same DSP buffer sizes) on either side of the network are prevalent, however, with the passage of time, these structures will be replaced by structure that commonly includes different buffer sizes depending on which company's equipment is being employed. At that time, it will become essential to adapt to the various buffer sizes while maintaining maximum system performance and efficiency. Additionally, the user is offered optimization of the buffer size for adapting to different network scenarios.

For example, today there is approximately six micro-seconds per kilometer of delay per packet (for a 64-byte packet size). Therefore, for a user to transmit information from the U.S. to Europe, there is far more delay than for the same user to transmit information within the U.S. or somewhere closer in terms of distance. Also, there are times when the network is being used far more heavily than other times. There are generally several types of delay in networking environments, such as propagation delay (propagation delay has to do with how far apart devices that are communicating are located with respect to each other) and processing delay. There is also the added delay for buffering and re-buffering due to the length of the buffer size problem explained above.

The present invention allows for adaptation to different delay scenarios by setting-up a different buffer size between the send and receive apparatus. This is especially effective when a network has been set-up to operate with a predetermined buffer size and it is noticed that the network is not properly conforming because voice quality is poor. Accordingly, the buffer size is altered to improve voice quality by reducing the delay associated with transmission of information. The present invention allows for negotiation or re-negotiation of buffer size based upon statistical data related to the network traffic, i.e. traffic through the network in the recent past or on particular days in the past for so many years and the like.

Figure 3:
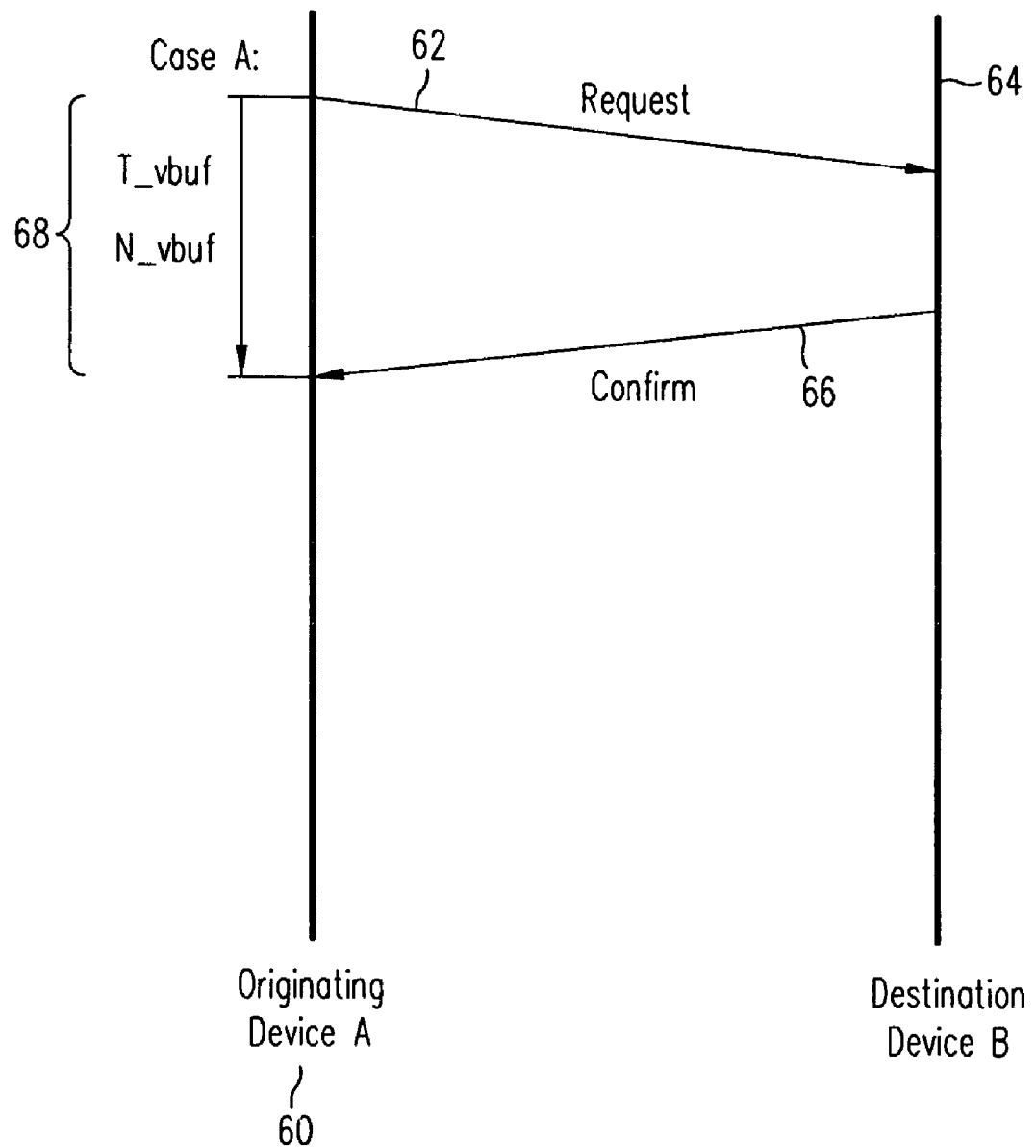
FIGS. 3-8 shows examples of different operational scenarios as may occur in employing the preferred embodiment depicted in FIG. 2.

FIGS. 3-8 show examples of different scenarios that may be present during negotiation of buffer sizes between two devices, such as devices 42 and 54 (in FIG. 2). In FIG. 3, an originating device A 60 (this device may include the DSP and interface devices, 44 and 46, discussed above with respect to FIG. 2) is shown to send a request packet 62 including the buffer size that the device 60 can support to a destination device B 64 (this device may include the DSP and interface devices, 52 and 50, discussed above with respect to FIG. 2). The destination device 64 receives the request packet 62 and verifies whether or not it is available to support the offered buffer size. If the destination device 64 can support the offered buffer size, then it will issue a confirmation packet 66, in response to the offered buffer size, back to the originating device 60 in less than T_vbuf time. T_vbuf represents the time associated with sending a request packet and receiving a confirmation packet. N_vbuf represents the number of times that a request packet may be sent before negotiations are terminated, as will be made clear in the examples to follow. T_vbuf multiplied by N_vbuf represents the entire time, at 68 (in FIG. 3), that request packets are sent and confirmation packets are received.

Figure 4:
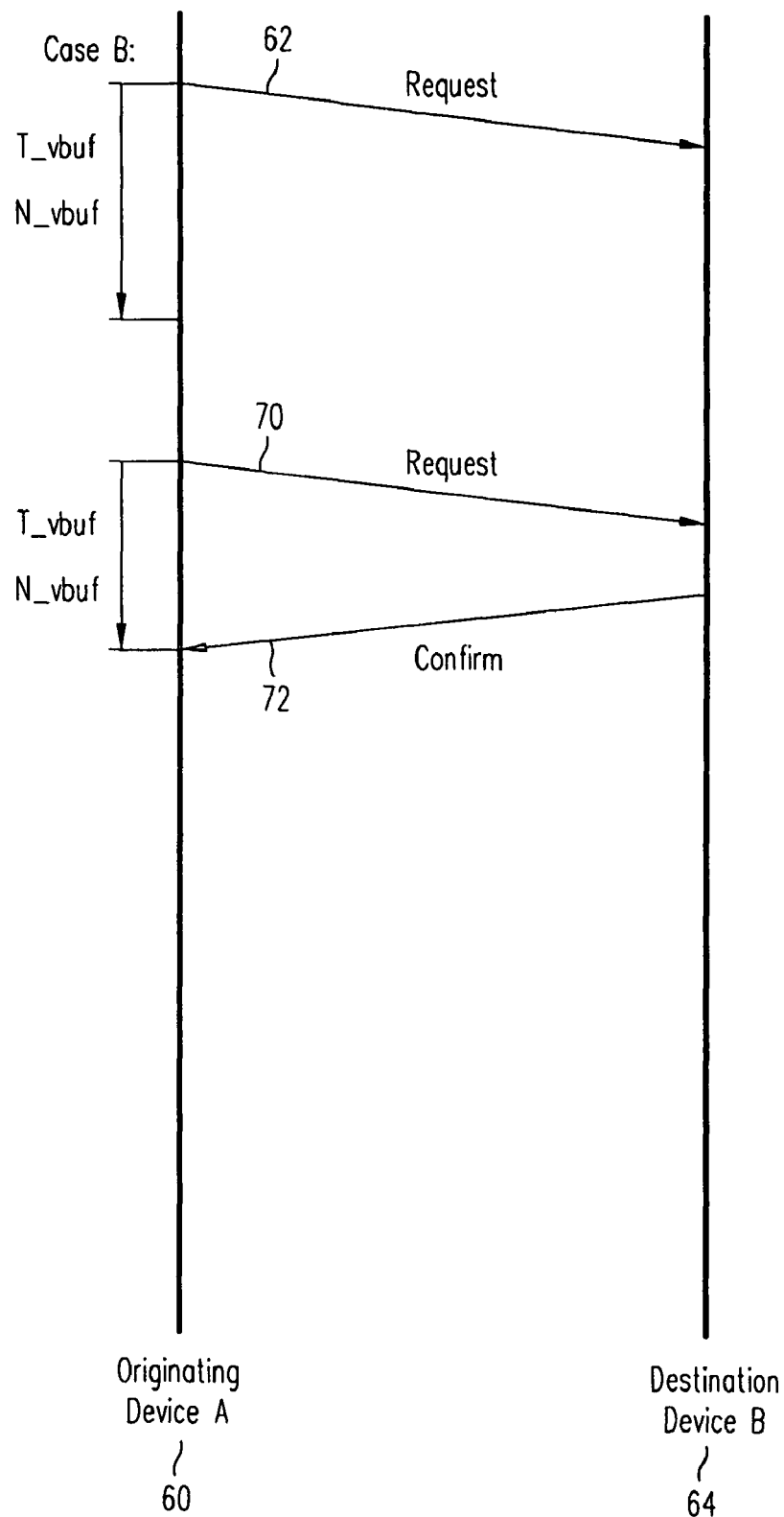

FIG. 4 shows another example of the protocol between two devices communicating through the packet switch network using the method and apparatus of the present invention. In FIG. 4, originating device 60 sends a request packet 62 to destination device 64 and awaits a time, defined by T_vbuf, for a confirmation packet from the destination device 64. In this example, the originating device 60 receives no confirmation packet back from the destination device 64 within the time period defined by T_vbuf. Consequently, once the time, T_vbuf, has expired, another request packet 70 is sent. In fact, if no confirmation packet is received, the originating device 60 continues to send request packets and awaits T_vbuf for a return confirmation an N_vbuf number of times. In this example, after the second time a request packet is sent, a confirmation packet 72 is received. However, if no such confirmation packet is received and an N_vbuf number of request packets are sent, then a time-out is declared. Thus, the time-out limit is defined by the values of T_vbuf and N_vbuf, which are both programmable by the user and are practically adjusted as a function of where calls are being made from and to and the distance a call has to travel.

Figure 5:
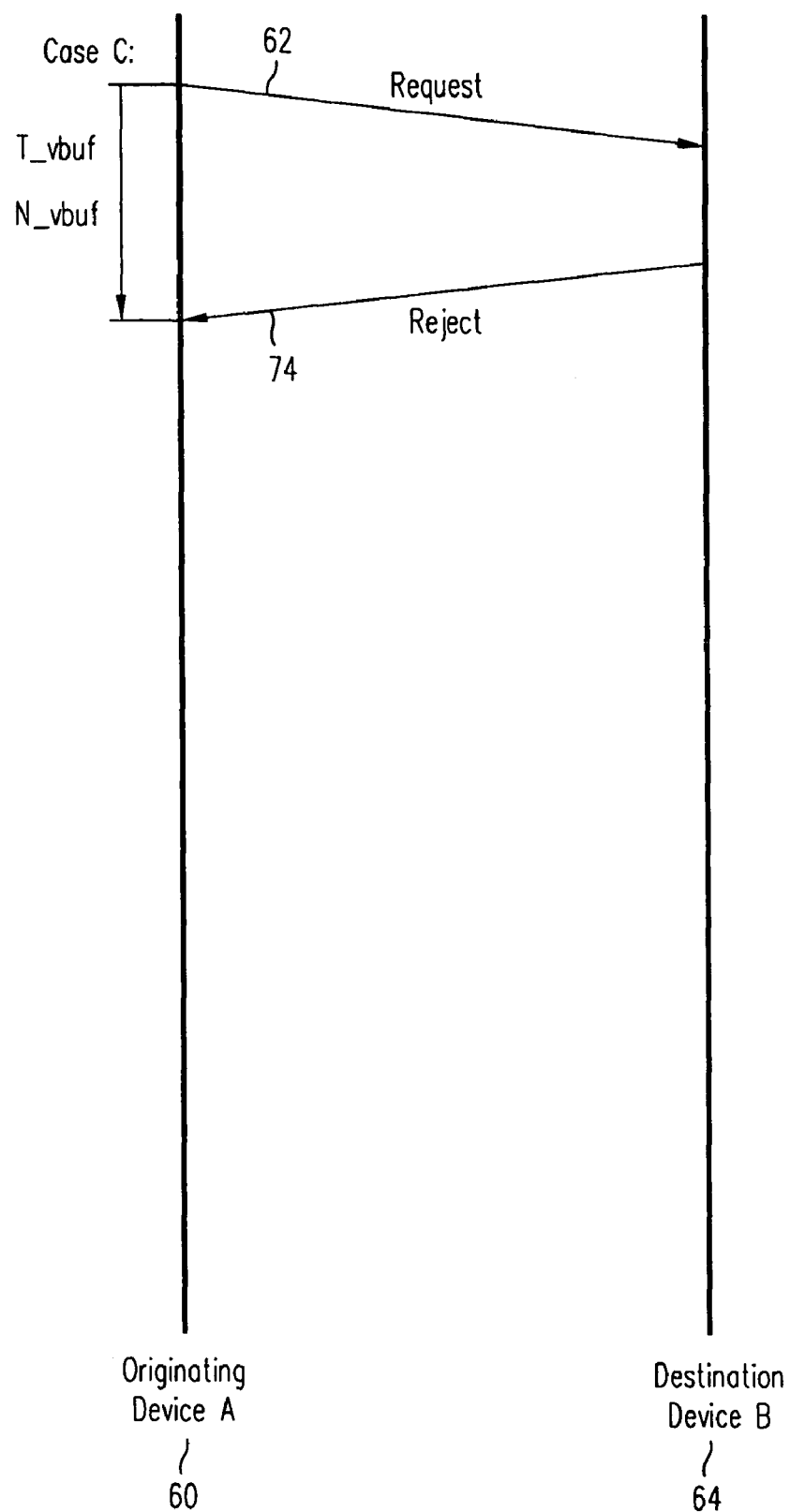

In FIG. 5, an example is shown of a request packet 62 being sent from the originating device 60 to the destination device 64. The originating device 60 includes the buffer size it supports within the request packet 62 but in this example, the buffer size of the originating device 60 is not available at the destination device 64. Consequently, a reject packet 74 is sent to the originating device 60 by the destination device 64 to reflect that the originating device's buffer size can not be supported and in this case each device uses its own buffer size during transfer of information therebetween.

Figure 6:
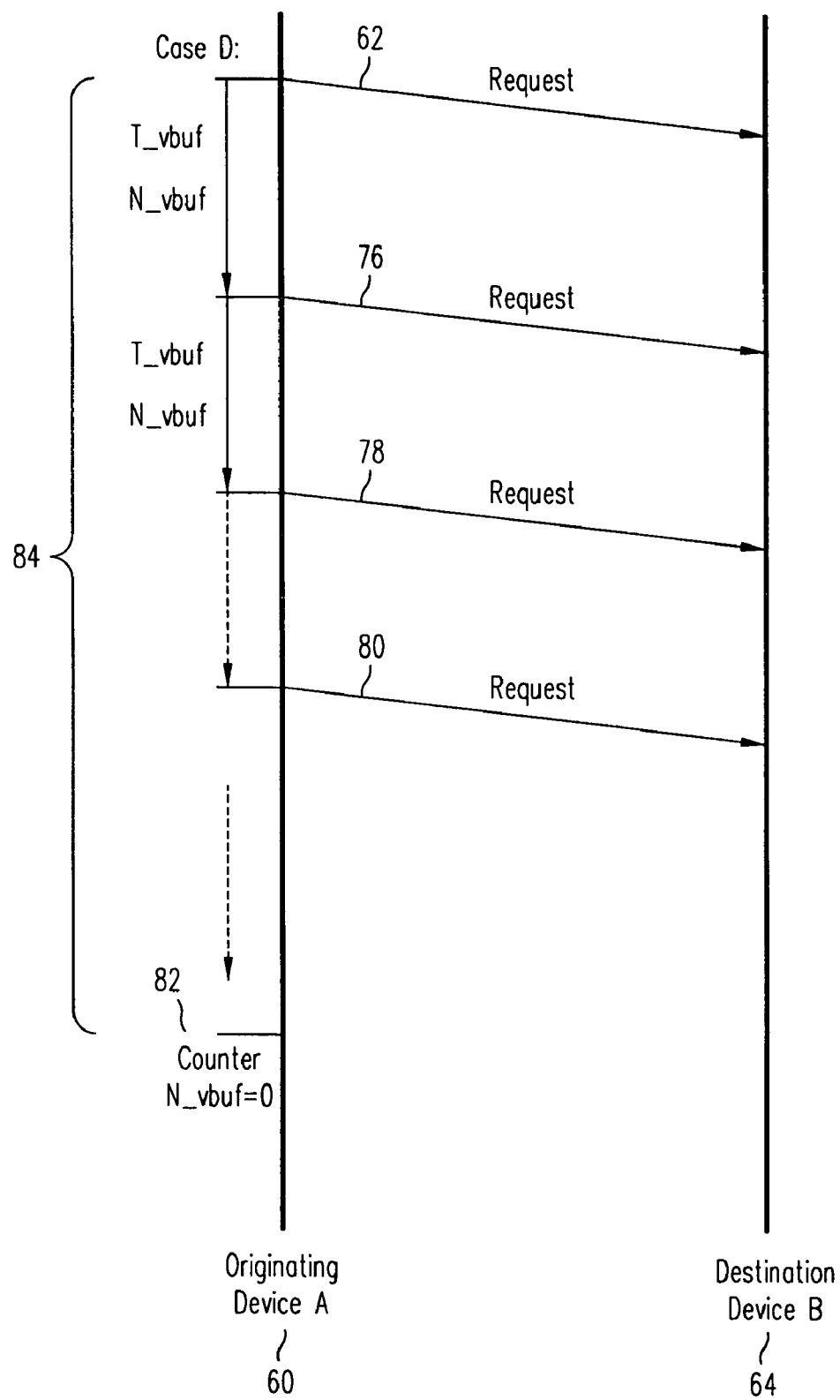

In FIG. 6, while multiple request packets, 62, 76, 78 and 80, are sent from the originating device 60 to the destination device 64, no confirmation packets or reject packets, responsive to the originating device's request are sent by the destination device 64. In this case, the timer, defined by T_vbuf multiplied by N_vbuf, times out or expires, as shown at 82 (the time T_vbuf times, or multiplied by, N_vbuf is shown at 84) and each of the originating and destination devices use their own buffer size.

Figure 7:
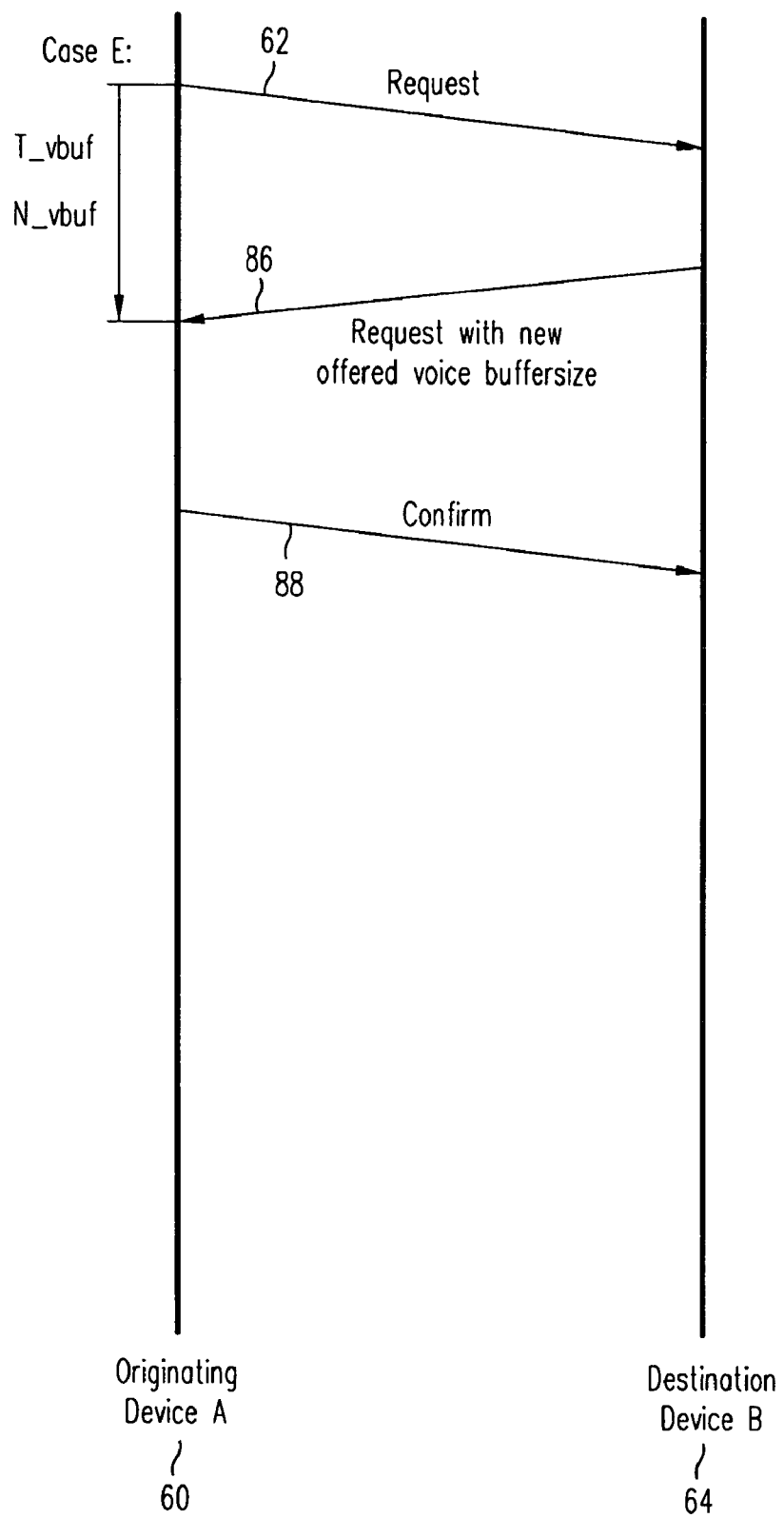

In FIG. 7, the originating device 60 to the destination device 64 sends the request packet 62 but in this case, the requested buffer size is not available at the destination device 64. However, instead of sending a reject packet, the destination device 64 sends a different buffer size, which is included within a request 86 to the originating device 60. This is in effect, a request for a new, or different, buffer size other than the buffer size offered by the originating device. Additionally, the destination device 64 starts its T_vbuf timer awaiting confirmation from the originating device 60. The buffer size that is included within the request 86 is a buffer size that is supported by the destination device 64. The originating device 60, in turn, sends a confirmation packet 88 to the destination device 64, which includes information either confirming use of this new buffer size or rejecting the same. In the case where the new buffer size is accepted by the originating device 60, this new buffer size is employed during information transfer, otherwise, each device uses its own buffer size.

Figure 8:
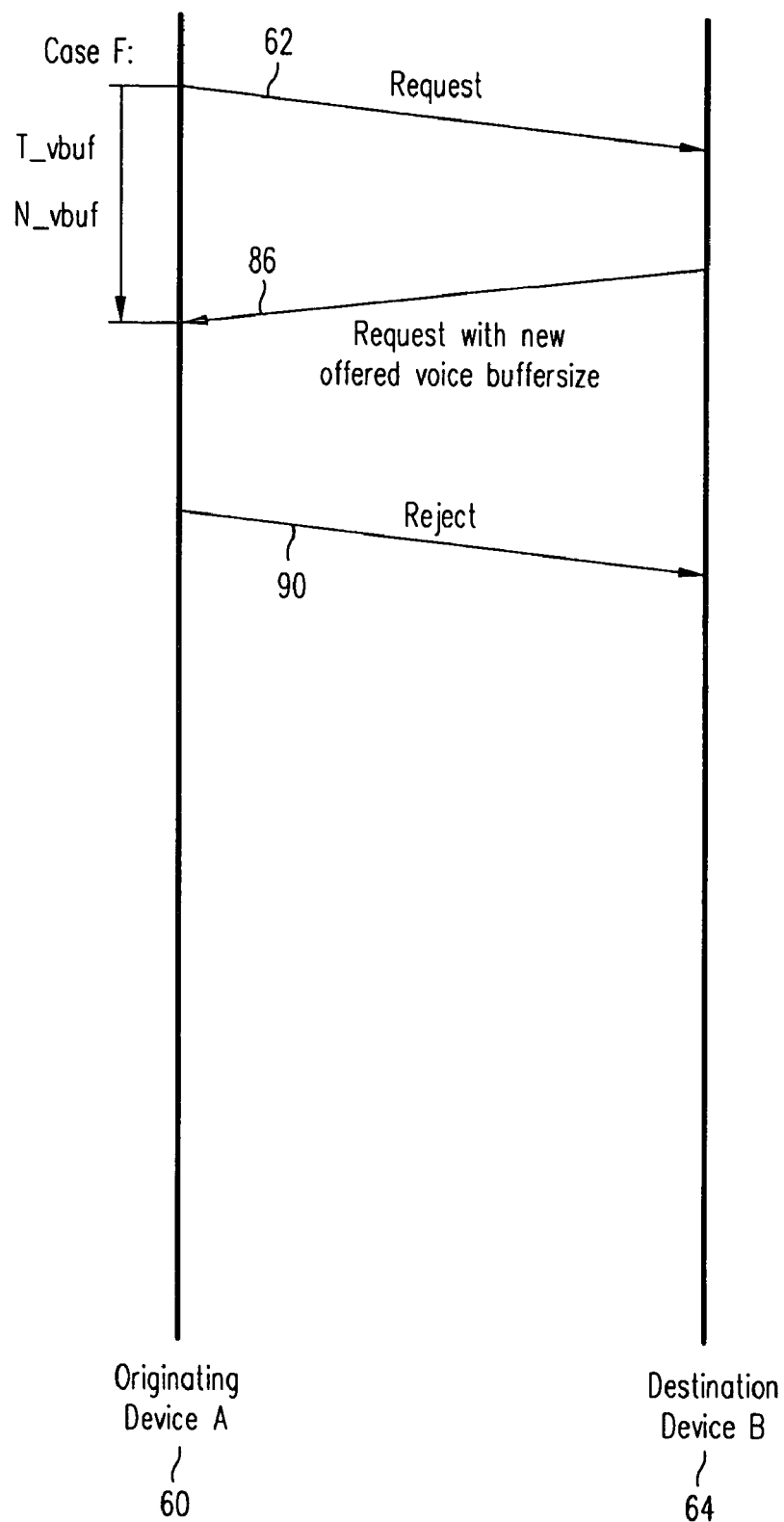

FIG. 7 is shown as an example of when the new buffer size is accepted by the originating device 60 and thus the confirmation packet 88 is sent accordingly. FIG. 8, on the other hand, is shown as an example of when the new buffer size is not supported by the originating device 60 and a reject packet 90 is sent to the destination device 64 indicating so. As previously noted, in the example shown in FIG. 7, the system uses the new buffer size offered by the destination device 64 within the request packet 86, whereas in the example shown in FIG. 8, each of the originating and destination devices use their own buffer size.

While the discussion above may not have reflected so, in each of the request packets shown in FIGS. 3-8, there is included the buffer size that the originating device is offering to use during buffer negotiations performed at the outset of a call initiation. Further a person of ordinary skill in the art will appreciate that the inventive principles can be embodied in a computer readable medium having stored therein computer readable program code comprising instructions for performing the steps of the embodiments described above.

While the invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

What I claim is:

1. A sending device for use in a packet switching network system for transferring packetized information, comprising:
    a sending digital buffer with a predetermined sending buffer size, the sending digital buffer configured to store information provided by a user that is to be sent to a destination device through the packet switching network,
    wherein the sending device is configured to send a request packet including the sending buffer size to the destination device through the packet switching network,
    wherein said sending device includes:
        an originating telecommunications device operative to develop originating analog signals responsive to the information provided by the user;
        an originating digital signal processing (DSP) device configured to produce originating digital interface signals by converting the originating analog signals into digital format and store the originating digital interface signals in the sending digital buffer; and
        an originating interface device operative to develop network packets for transfer in frames through the packet switching network to the destination device, and
    wherein the sending device and the destination device enter into negotiations as to a mutually-acceptable digital buffer size that is to be used for information transfer through the packet switching network system thereby increasing system performance by reducing or avoiding delays experienced by the user and the negotiations terminate upon one of the receiving a confirmation packet acknowledging the sending buffer size can be supported, the request packet is sent a number of times until a predetermined number of requests is reached with no response, receiving a reject message indicating that the sending buffer size is not supported at the destination device resulting in the sending device and destination device will use their own buffer sizes, a predetermined time interval equal to the predetermined number of requests multiple by a time associated with sending the request packet and receiving the confirmation packet expires, or a request for a different buffer size than was sent in the request packet is received generated at the destination device.

2. A sending device for use in a packet switching network system for transferring information that is in the form of packets comprising:
    buffer means having a predetermined first buffer size, the buffer means for use in storing information provided by a user in digital form that is to be sent, through the packet switching network, to a destination device,
    wherein the sending device is configured to send a request packet including the first buffer size to the destination device through the packet switching network,
    wherein said sending device includes:
        an originating telecommunications device operative to develop originating analog signals responsive to the information provided by the user; and
        an originating digital signal processing (DSP) device configured to develop originating digital interface signals by converting the originating analog signals to digital format and store the originating digital interface signals in the sending digital buffer;
        an originating interface device configured to develop network packets responsive to said originating digital interface signals for transfer in frames through the packet switching network to the destination device, and
    wherein the sending device and the destination device enter into negotiations as to a mutually-acceptable digital buffer size that is to be used for information transfer through the packet switching network system thereby increasing system performance by reducing or avoiding delays experienced by the user and the negotiations terminate upon one of the receiving a confirmation packet acknowledging the sending buffer size can be supported, the request packet is sent a number of times until a predetermined number of requests is reached with no response, receiving a reject message indicating that the sending buffer size is not supported at the destination device resulting in the sending device and destination device will use their own buffer sizes, a predetermined time interval equal to the predetermined number of requests multiple by a time associated with sending the request packet and receiving the confirmation packet expires, or a request for a different buffer size than was sent in the request packet is received generated at the destination device.

3. A method for negotiating buffer size in a packet switching network system for transferring information that is in the form of packets between a sending device and a receiving device comprising:
    receiving information to be transmitted to a destination device;
    sending a request packet including a first buffer size associated with a first digital buffer, through the packet switching network, to the destination device;
    negotiating a mutually-acceptable buffer size that is to be used for information transfer through the packet switching network system and the negotiations terminate upon one of the receiving a confirmation packet acknowledging the sending buffer size can be supported, the request packet is sent a number of times until a predetermined number of requests is reached with no response, receiving a reject message indicating that the sending buffer size is not supported at the destination device resulting in the sending device and destination device will use their own buffer sizes, a predetermined time interval equal to the predetermined number of requests multiple by a time associated with sending the request packet and receiving the confirmation packet expires, or a request for a different buffer size than was sent in the request packet is received generated at the destination device;

receiving information provided by a user;

developing originating analog signals based on the information provided by the user;

developing originating digital interface signals by converting the originating analog signals to digital format;

storing the originating digital interface signals in the first digital buffer; and developing network packets responsive to the originating digital interface signals for transfer in frames through the packet switching network to the destination device.

4. A computer readable medium having stored therein computer readable program code comprising instructions for performing the following steps:

receiving information to be transmitted to a destination device;

sending a request packet including a first buffer size associated with a first digital buffer, through the packet switching network, to the destination device;

negotiating a mutually-acceptable buffer size that is to be used for information transfer through the packet switching network system and the negotiations terminate upon one of the receiving a confirmation packet acknowledging the sending buffer size can be supported, the request packet is sent a number of times until a predetermined number of requests is reached with no response, receiving a reject message indicating that the sending buffer size is not supported at the destination device resulting in the sending device and destination device will use their own buffer sizes, a predetermined time interval equal to the predetermined number of requests multiple by a time associated with sending the request packet and receiving the confirmation packet expires, or a request for a different buffer size than was sent in the request packet is received generated at the destination device;

receiving information provided by a user;

developing originating analog signals based on the information provided by the user;

developing originating digital interface signals by converting the originating analog signals to digital format;

storing the originating digital interface signals in the first digital buffer; and developing network packets responsive to the originating digital interface signals for transfer in frames through the packet switching network to the destination device.

5. A destination device, for use in a packet switching network system for transferring information that is in the form of packets between an originating device and the destination device via network signals through the packet switching network comprising:

a receiving digital buffer with a predetermined receiving buffer size, the receiving digital buffer configured to store information that is received from the originating device;

a destination interface device operative to develop destination DSP signals responsive to said network signals received from the originating device;

a destination DSP device operative to store the destination DSP signals in the receiving digital buffer and develop destination telecommunications signals responsive to said destination DSP signals by converting said destination DSP signals from digital format to analog format; and a destination telecommunications device responsive to said destination telecommunications signals, wherein the destination device is operative to:

receive a request packet, including a sending buffer size of the originating device, from the originating device;

determine whether or not the sending buffer size is supported by the destination device; and send a response to the originating device, through the packet switching network, as to whether or not the received sending buffer size is supported by the destination device, and wherein the originating device and the destination device enter into negotiations as to a mutually-acceptable digital buffer size that is to be used for information transfer by the packet switching network system thereby increasing system performance by reducing or avoiding delays experienced by the user and the negotiations terminate upon one of the sending a confirmation packet acknowledging the sending buffer size can be supported, sending a reject message indicating that the sending buffer size is not supported at the destination device resulting in the sending device and destination device will use their own buffer sizes, a predetermined time interval equal to the predetermined number of requests multiple by a time associated with sending the request packet and receiving the confirmation packet expires, or sending a request for a different buffer size than was sent in the request packet is sent from the destination device.

6. A destination device, for use in a packet switching network system for transferring information that is in the form of packets between an originating device and the destination device via network signals through the packet switching network comprising:

receiving buffer means having a predetermined receiving buffer size, the receiving buffer means for use in storing information that is received from the originating device;

a destination interface device operative to develop destination DSP signals responsive to said network signals received from the originating device;

a destination DSP device operative to store the destination DSP signals in the receiving buffer means and to develop destination telecommunications signals responsive to said destination DSP signals by converting said destination DSP signals from digital format to analog format; and a destination telecommunications device responsive to said destination telecommunications signals, wherein the destination is operative to:

receive a request packet, including a sending buffer size of the originating device, from the originating device;

determine whether or not the sending buffer size is supported by the destination device; and send a response to the originating device, through the packet switching network, as to whether or not the sending buffer size is supported by the destination device, and wherein the originating device and the destination device enter into negotiations as to a mutually-acceptable digital buffer size that is to be used for information transfer by the packet switching network system thereby increasing system performance by reducing or avoiding delays experienced by the user and the negotiations terminate upon one of the sending a confirmation packet acknowledging the sending buffer size can be supported, sending a reject message indicating that the sending buffer size is not supported at the destination device resulting in the sending device and destination device will use their own buffer sizes, a predetermined time interval equal to the predetermined number of requests multiple by a time associated with sending the request packet and receiving the confirmation packet expires, or sending a request for a different buffer size than was sent in the request packet is sent from the destination device.

7. A method for negotiating buffer size between an originating device and a destination device for use in a packet switching network system through a packet switching network comprising:

receiving a request packet, including a sending buffer size of the originating device, from the originating device;

converting the request packet into analog form;

determining whether or not the sending buffer size is supported by the destination device;

sending back a response to the originating device, through the packet switching network, as to whether or not the sending buffer size is supported by the destination device; and negotiating as to a mutually-acceptable buffer size that is to be used for information transfer through the packet switching network system to reduce or avoid delays and the negotiations terminate upon one of the sending a confirmation packet acknowledging the sending buffer size can be supported, sending a reject message indicating that the sending buffer size is not supported at the destination device resulting in the sending device and destination device will use their own buffer sizes, a predetermined time interval equal to the predetermined number of requests multiple by a time associated with sending the request packet and receiving the confirmation packet expires, or sending a request for a different buffer size than was sent in the request packet is sent from the destination device.

8. A computer readable medium having stored therein computer readable program code comprising instructions for performing the following steps:

receiving a request packet, including a sending buffer size associated with the originating device, from the originating device;

converting the request packet into analog form;

determining whether or not the sending buffer size is supported by the destination device;

sending back a response to the originating device, through the packet switching network, as to whether or not the sending buffer size is supported by the destination device; and negotiating as to a mutually-acceptable buffer size that is to be used for information transfer through the packet switching network system to reduce or avoid delays and the negotiations terminate upon one of the sending a confirmation packet acknowledging the sending buffer size can be supported, sending a reject message indicating that the sending buffer size is not supported at the destination device resulting in the sending device and destination device will use their own buffer sizes, a predetermined time interval equal to the predetermined number of requests multiple by a time associated with sending the request packet and receiving the confirmation packet expires, or sending a request for a different buffer size than was sent in the request packet is sent from the destination device.

9. A sending device, comprising:

an analog originating device configured to generate an analog output responsive to a user input;

an originating digital signal processing (DSP) device configured to convert the analog output into a digital output and to store the digital output in a sending buffer having a fixed and predetermined sending buffer size; and an originating interface device configured to generate network signals for transmission in a packet network responsive to the digital output;

wherein the network signals comprise a request packet including the fixed and predetermined sending buffer size of the sending buffer and wherein the originating interface device is configured to transmit the request packet to a destination device having a receiving buffer with a fixed and predetermined receiving buffer size, and wherein the originating interface device is further configured to:

receive an acknowledgement packet from the destination device responsive to the request packet;

repeat the transmission of the request packet until a timeout limit is reached or the acknowledgment packet is received; and send at least one of a confirmation packet and a reject packet responsive to the acknowledgment packet.

10. The sending device of claim 9, wherein the fixed and predetermined receiving buffer size is at least as large as the fixed and predetermined sending buffer size and wherein the acknowledgment packet is a confirmation packet.

11. The sending device of claim 10, wherein the acknowledgment packet is a reject packet indicating that the destination device cannot support the fixed and predetermined sending buffer size.

12. The sending device of claim 9, wherein the acknowledgment packet includes the fixed and predetermined receiving buffer size.

\* \* \* \* \*